United States Patent
Winters et al.

(10) Patent No.: US 10,205,513 B1
(45) Date of Patent: Feb. 12, 2019

(54) SYSTEM AND METHOD FOR IMPROVED BEYOND LINE-OF-SIGHT COMMUNICATIONS USING NATURAL PHENOMENA

(71) Applicant: Lockheed Martin Corporation, Bethesda, MD (US)

(72) Inventors: Jack H. Winters, Middletown, NJ (US); Michael J. Luddy, Princeton, NJ (US); Daniel H. Moskowitz, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/671,280

(22) Filed: Mar. 27, 2015

(51) Int. Cl.
   *H04B 17/00* (2015.01)
   *H04B 7/22* (2006.01)
   *H04W 24/02* (2009.01)

(52) U.S. Cl.
   CPC .............. *H04B 7/22* (2013.01); *H04W 24/02* (2013.01)

(58) Field of Classification Search
   CPC ...... H04B 7/22; H04B 7/0615; H04B 7/0842; H04W 24/02
   See application file for complete search history.

(56) References Cited

U.S. PATENT DOCUMENTS

| | | | | |
|---|---|---|---|---|
| 4,060,809 A | * | 11/1977 | Baghdady | G01S 1/40 342/451 |
| 4,125,893 A | * | 11/1978 | Hitney | G01S 7/4004 702/3 |
| 9,136,938 B1 | * | 9/2015 | Babich | H04B 7/22 |
| 2004/0032364 A1 | * | 2/2004 | Saucier | G01S 3/023 342/174 |
| 2004/0042427 A1 | * | 3/2004 | Hottinen | H04L 1/0027 370/335 |
| 2005/0053164 A1 | * | 3/2005 | Catreux | H04B 7/0615 375/260 |
| 2005/0053170 A1 | * | 3/2005 | Catreux | H04B 7/0615 375/267 |

(Continued)

OTHER PUBLICATIONS

Dinc, Ergin et al., "MIMO Troposcatter Channel Modeling in the Presence of Rain and Cloud Attenuation," IEEE Transactions on Wireless Communications, Oct. 4, 2013.

(Continued)

*Primary Examiner* — Zhiyu Lu
(74) *Attorney, Agent, or Firm* — Howard IP Law Group (57) ABSTRACT

A method of optimizing BLoS communications between a first asset and a second asset using at least one of atmospheric troposcatter and ducting signal propagating phenomena includes transmitting a plurality of test signals from multiple antenna elements of the first asset into the atmosphere. At least a portion of the test signals are received at multiple antenna elements of the second asset. The second asset is configured to calculate a gain and phase shift of the channel between each transmitting and receiving antenna element, calculate optimized antenna weights for the transmitting and receiving antenna elements, and estimate a communication channel coherence time and coherence bandwidth. These parameters may be transmitted to the first asset and applied thereto for optimizing communications between the first and second assets.

20 Claims, 8 Drawing Sheets

(56) References Cited

U.S. PATENT DOCUMENTS

| | | | | |
|---|---|---|---|---|
| 2005/0220207 | A1* | 10/2005 | Perlman | H04L 1/0618 375/267 |
| 2006/0209923 | A1* | 9/2006 | Jin | H04B 7/063 375/130 |
| 2007/0025464 | A1* | 2/2007 | Perlman | H04B 7/0684 375/267 |
| 2007/0153744 | A1* | 7/2007 | Goldberg | H04B 7/02 370/334 |
| 2008/0267133 | A1* | 10/2008 | Shida | H04B 7/0626 370/334 |
| 2008/0310336 | A1* | 12/2008 | Gaikwad | H04L 7/046 370/310 |
| 2010/0125347 | A1* | 5/2010 | Martin | G05B 13/044 700/31 |
| 2010/0159914 | A1* | 6/2010 | Ancora | H04L 5/0048 455/422.1 |
| 2011/0002371 | A1* | 1/2011 | Forenza | H04B 7/0417 375/227 |
| 2014/0105054 | A1* | 4/2014 | Sægrov | H01Q 3/2605 370/252 |
| 2014/0192768 | A1* | 7/2014 | Yeh | H04B 7/0456 370/330 |
| 2014/0219237 | A1* | 8/2014 | Charbit | H04W 72/044 370/330 |
| 2015/0029058 | A1* | 1/2015 | Robey | G01S 11/02 342/458 |
| 2015/0256401 | A1* | 9/2015 | Zinger | H04L 41/14 370/401 |

OTHER PUBLICATIONS

Maechler, P. et al., "Implementation of Greedy Algorithms for LTE Sparse Channel Estimation," 2010 Conference Record of the Forty Fourth Asilomar Conference on Signals, Systems and Computers (ASILOMAR), Nov. 7-10, 2010.

Dinc, Ergin et al., "Fading Correlation Analysis in MIMO-OFDM Troposcatter Communications: Space, Frequency, Angle and Space-Frequency Diversity," IEEE Transaction on Communications, vol. 63, No. 2; Feb. 2015.

Luddy, Michael J. et al., "Beyond Line-of-Sight Communications with Smart Antennas (BLoSSA);" Intelligent Ships Symposium IX; May 25-26, 2011.

* cited by examiner

Example CSI (real part of $h_{ij}$) versus time.

*Fig. 3A*

Example correlation of CSI (real part of $h_{ij}$) versus time.

*Fig. 3B*

Example correlation of CSI (real part of $h_{ij}$) versus time.

SYSTEM AND METHOD FOR IMPROVED BEYOND LINE-OF-SIGHT COMMUNICATIONS USING NATURAL PHENOMENA

FIELD OF THE INVENTION

The present invention relates to communication systems and, more specifically, to systems and methods for improving beyond line-of-sight (BLoS) communications using natural phenomena.

BACKGROUND

Network centric warfare requires far reaching, highly reliable communication channels between assets for effective and efficient operation. These assets, such as naval ships and aircraft, may be separated by significant distances, including being positioned BLoS. Current methods of achieving BLoS communication between two assets include the use of relays, such as airborne platforms (e.g., aircraft) located at suitable elevations or intermediate distances between the assets for achieving line-of-sight communication between each asset and the relay(s). However during tactical operations, including those under hostile conditions, such relay arrangements may prove impossible or impractical to implement. Moreover, currently employed communication relay hardware can be expensive and unreliable (e.g., it may not be sufficiently robust). Alternative solutions include the use of satellite relays. However, in addition to being costly and requiring a line-of-sight (LoS) to the satellite, existing satellite communication systems may exhibit high latency and congestion. Each of these relay-based techniques is also inherently vulnerable to physical attack and jamming tactics, making them unreliable for use in hostile environments.

Some systems and methods having been implemented utilizing natural phenomena to achieve BLoS communication between one or more assets. For example, methods such as HF (ionospheric) and Near-Vertical Incidence Skywave (NVIS) communications utilize ionization by solar radiation. However, these methods can be limited by the diurnal solar cycle. Moreover, these methods do not reliably provide both substantial range and throughput, and can suffer from bandwidth congestion.

One potentially advantageous communication technique is the use of troposcatter and/or atmospheric ducting signal propagation to accomplish BLoS communications. For example, propagation losses for a duct-confined signal propagation path are linearly proportional to the range, compared to at least a range-squared loss for LoS propagation. Moreover, losses in the ducting due to aerosols are more than compensated for by the lower propagation loss due to the smaller spreading volume of the duct versus the isotropic case. For specific conditions, the use of ducting can provide an approximately 40 dB increase in signal strength at 1000 km for signals in the GHz range. However, the ducting layer also creates multiple signal pathways. Because the duct acts as a leaky waveguide the signal is reflected or absorbed into, for example, the sea surface (the bottom of the duct for a marine boundary layer duct) and the ill-defined duct transitions. As a result, multiple iterations or copies of a signal may arrive at different phases, as the different iterations have traversed different path lengths. If the phases of these different iterations add destructively, the signal level relative to noise declines, making detection more difficult. Thus, these multiple pathways reduce the maximum range for a given data rate. Additionally, intersymbol interference (ISI) due to the arrival of separate signal copies at different times will tend to degrade the signal; one or more delayed copies of a pulse may arrive at the same time as the primary pulse for a subsequent bit. The ISI due to this delay spread limits the maximum data rate without signal distortion. Similar issues are present with troposcatter propagation. Further still, while these methods have the potential to offer improved throughput with suitable range, their effectiveness depends on ever-changing atmospheric conditions. Accordingly, these methods tend to be unpredictable and unreliable, at least as currently implemented via dish antennas generating single carrier transmissions in a fixed frequency band.

Improved systems and methods for providing reliable, long-range BLoS communications between assets are desired.

SUMMARY

In one embodiment of the present disclosure, a method of optimizing BLoS communications between a first asset and a second asset using at least one of atmospheric troposcatter and ducting signal propagating phenomena is provided. The method includes the steps of receiving at least a portion of a plurality of test signals transmitted by transmitting antenna elements of the first asset at multiple receiving antenna elements of the second asset, and calculating channel state information between each of the transmitting and receiving elements. Using the channel state information, optimized antenna weights for the transmitting and receiving antenna elements are calculated, along with an estimated channel coherence time. The optimized antenna weights are applied to the transmitting and receiving antennas for use in subsequent communication operations.

In another embodiment of the present disclosure, a system for optimizing BLoS communications between a first asset and a second asset is provided. The system includes a receiving antenna array comprising a plurality of antenna elements. One or more computer processors is provided and arranged in communication with a memory device storing program instructions. The one or more processors is operative with the program instructions to at least: 1) receive at least a portion of a plurality of test signals transmitted from multiple antenna elements of the first asset at the plurality of antenna elements of the second asset; 2) calculate channel state information between each transmitting and receiving antenna element; 3) calculate optimized antenna weights for the transmitting and receiving antenna elements according to the calculated channel state information between each transmitting and receiving element; 4) estimate a communication channel coherence time; and 5) apply the optimized antenna weights to the receiving antenna elements.

DETAILED DESCRIPTION

It is to be understood that the figures and descriptions of the present invention have been simplified to illustrate elements that are relevant for a clear understanding of the present invention, while eliminating, for purposes of clarity, many other elements found in typical communication systems, such as radio frequency (RF) or microwave-based communication systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Figure 1:
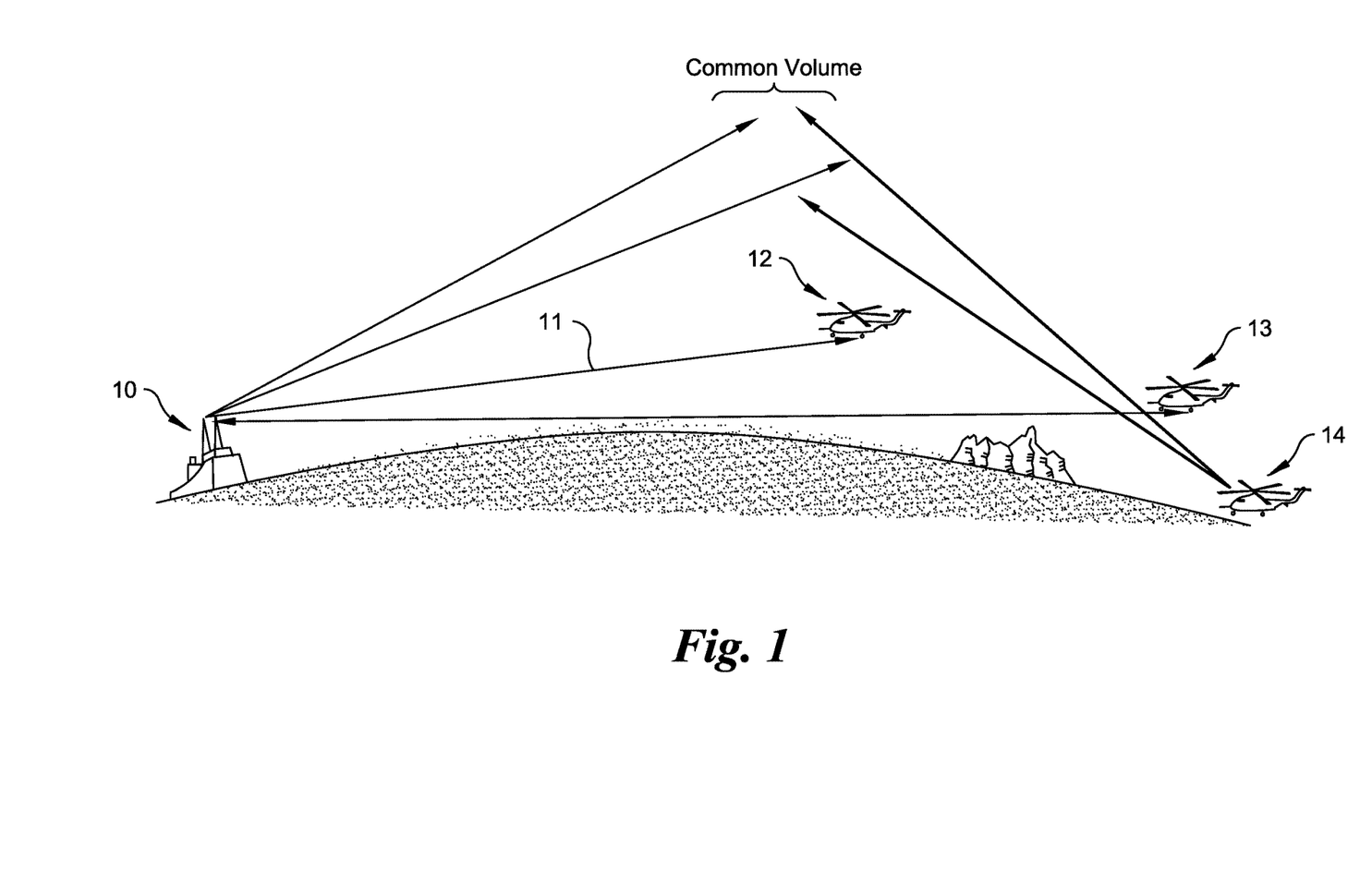
FIG. 1 is a simplified diagram illustrating BLoS communications between assets in a maritime environment.

FIG. 1 illustrates exemplary long-range communications between a vessel 10 (e.g., a naval ship) and a plurality of assets 12,13,14. Traditional means of communication include the LoS transmission of, for example, electromagnetic signals 11 (e.g., RF or microwave waveforms) between vessel 10 and assets 12,13. Systems have also been implemented which utilize troposcatter and ducting signal propagation characteristics to achieve BLoS communications when LoS transmissions are not possible. As will be understood by one of ordinary skill in the art, troposcatter, or tropospheric scatter, is the scattering of propagating signals (e.g., frequency modulated, EM communication signals) due to particles/imperfections in the troposphere. More specifically, a signal transmitted into the atmosphere may be directly affected by weather and other tropospheric conditions (e.g., temperature, cloud cover, fog) and as a result, may propagate over hundreds or thousands of miles, well beyond the range achievable by typical LoS transmissions. Likewise, tropospheric ducting is a type of EM signal propagation that occurs when a signal encounters a rise in temperature in the atmosphere instead of the normal decrease (i.e., a temperature inversion). These ducts can be elevated, e.g., a few km above the surface, surface-based, and evaporation ducts. The higher refractive index of the higher temperature atmosphere causes the signal to be "bent" or redirected, enabling long-range signal propagation. As described above, however, existing systems relying on these atmospheric properties for performing BLoS communications are generally unreliable and suffer from low data rates at any one time, signal frequency, and/or transmit/receive beam direction.

Recent modeling and analysis of troposcatter ducting, including their delay, Doppler time/bandwidth coherence and angular spread characteristics, have illustrated the potential for significant performance improvements in these BLoS communication systems. For example, sufficiently high data rates have been shown to be achievable via transmissions having optimized signal frequencies and transmit/receive antenna beampatterns. Likewise, it has been shown that the coherence time of these channels (i.e., the time period for which the optimum parameters are relatively constant) is sufficiently long for channel state information (CSI) to be generated, and optimized transmit and receive weights calculated and communicated back to the source transmitter. These weights are utilized by the transmitting and receiving antennas for providing improved communication, until the channel has deleteriously changed to a degree that they are longer effective for communicating a transmitted signal.

In view of this insight, and still referring to FIG. 1, embodiments of the present disclosure are directed to improving BLoS communication between assets utilizing the ducting layer in conjunction with tropospheric/ionospheric scattering (e.g., communication between vessel 10 and asset 14). Vessel 10 and asset 14 may comprise respective communication systems, including transmitter(s), receiver(s) and associated antenna(s) in electromagnetic communication with a common airspace or common volume of atmosphere. By modifying or optimizing the transmission and reception characteristics of the respective communication systems of vessel 10 and asset 14, effective atmospheric troposcatter and/or tropospheric ducting signal propagation can be utilized to achieve the illustrated BLoS communication.

These methods may implement various techniques, including adaptive antenna arrays providing multipath mitigation and multiple-input-multiple-output (MIMO) communications, orthogonal frequency division multiplexing (OFDM), frequency diversity, and ad hoc networking. As a result, further increases in network speed and reliability may be realized. Moreover, the use of MIMO techniques, wideband antennas, frequency diversity and cognitive/ad hoc networking further decreases the probability of intercept/detection resulting in low probability of intercept/detection (LPI/LPD) by making a communication signal available only at the receiver location at a continuously changing frequency and path. Embodiments of the present disclosure may also include a joint optimization technique incorporating, for example, the greedy algorithm, using practically-implementable hardware based on measurements demonstrating potential real-time operation. These methods are described in, for example, "Implementation of greedy algorithms for LTE sparse channel estimation," Maechler, P., Greisen, P.; Sporrer, B.; Steiner, S.; Felber, N.; Burg, A., 2010 Conference Record of the Forty Fourth Asilomar Conference on *Signals, Systems and Computers (ASILOMAR)*, 7-10 Nov. 2010, the subject matter thereof incorporated by reference herein in its entirety.

Figure 2:
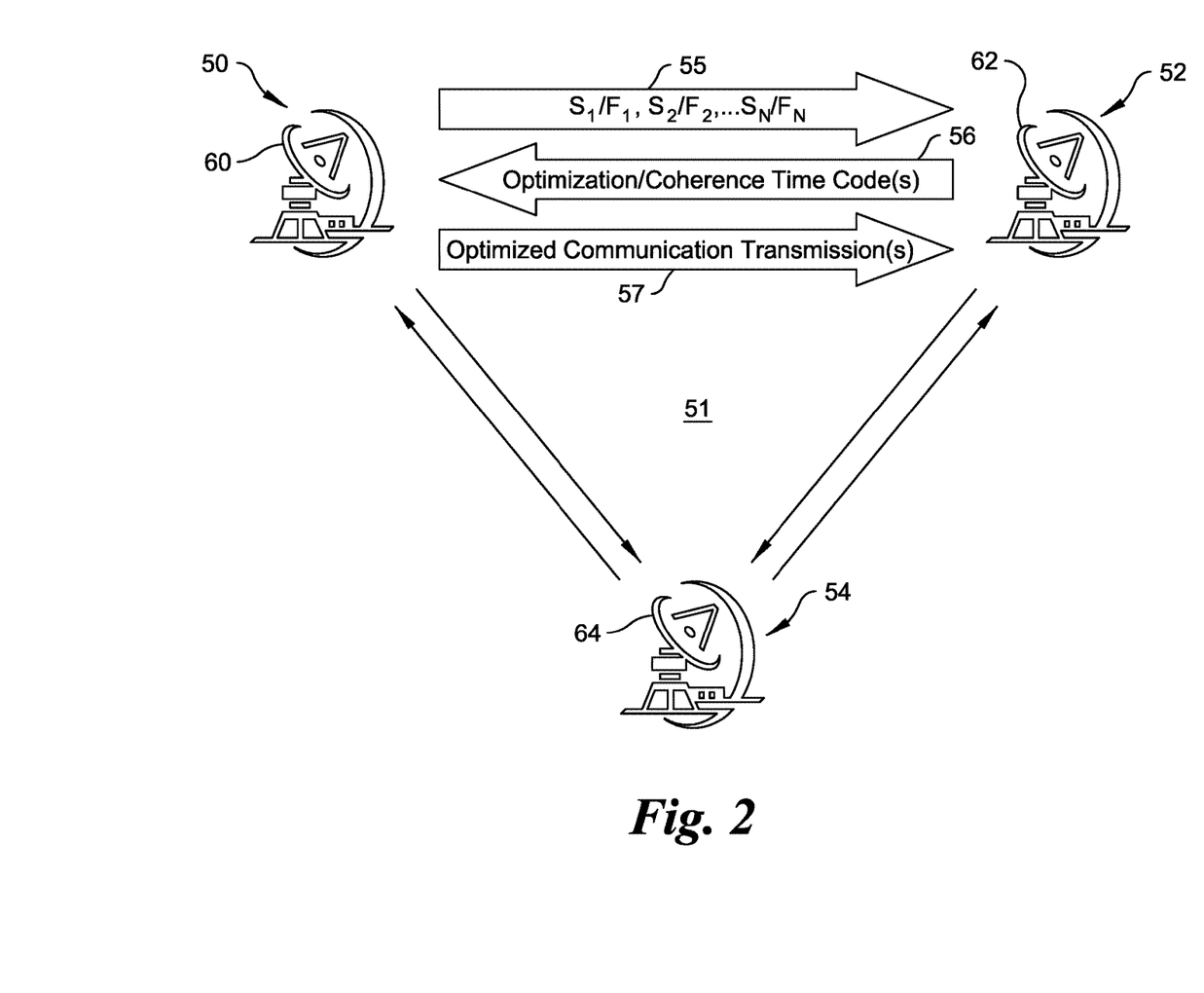
FIG. 2 is a simplified data flow diagram of a BLoS communication optimizing process according to embodiments of the present disclosure.

Referring generally to FIG. 2, a high-level data flow diagram is provided illustrating an exemplary communication system and optimization process thereof according to an embodiment of the present disclosure. The system includes a plurality of assets 50,52,54 at different locations. Each asset comprises a respective adaptive antenna array 60,62,64 (e.g., antenna arrays of assets 10,13,14 of FIG. 1), with each array comprising multiple transmitting and/or receiving antenna elements. Embodiments of the present disclosure will be described in the context of optimizing communications between assets 50,52. However, it should be understood that like processes may be applied to communications between each and any of assets 50,52,54.

An exemplary optimizing process includes the steps of transmitting a plurality of test signals 55 (also referred to as probe/pilot/synchronization signals, $S_1/F_1$, $S_2/F_2$, . . . , $S_N/F_N$) from adaptive antenna array 60 of asset 50 into the atmosphere. In one embodiment, test signals 55 comprise a plurality of discrete signals of at least varying magnitudes/phases and/or frequencies and may be transmitted in a variety of directions. For example, these test or pilot signals consist of data known at the receiver transmitted at different frequencies and in different directions to cover the range of frequencies, e.g., 2 to 20 GHz, and directions, e.g., 0 to 10 degrees in elevation, that could be used, with sufficient power to be detected at the receiver. At least a portion of test signals 55 are received using multiple antenna elements of adaptive antenna array 62 of asset 52.

A notable part of this process is the acquisition of the pilot tones by the receiver. As the transmitter and receiver can use very high gain antennas, e.g., 20 to 40 dB, and operate over very wide bandwidths, e.g., 2 to 20 GHz, it may be important that the receiver is oriented or pointed in the correct (e.g., proper) direction and processing the correct (e.g., select) frequencies for the transmitted pilots at the correct or appropriately select time(s). That is, the receiver typically cannot be receiving with high gain signals from all directions at all frequencies at all times. Thus, processing may be achieved via an initial procedure for the scanning in direction and frequency for the pilots from the transmitter. This procedure is also known at the receiver. Once the receiver has received the pilot tones transmitted during that initialization procedure, the receiver can send to the transmitter the schedule (e.g., time/frequency subcarrier/pointing direction) for the pilot tones, and listen in the appropriate direction and frequency at the appropriate time for the pilots.

Once received, an associated processing system, which may be co-located with asset 52, is configured to calculate a gain and phase shift for the propagation channel between each transmitting and receiving antenna element of adaptive antenna arrays 60,62 at different frequencies. These operations generate a channel matrix H (i.e., CSI), represented by:

$$H(f) = \begin{bmatrix} h_{11}(f) & \cdots & h_{1N}(f) \\ \vdots & \ddots & \vdots \\ h_{M1}(f) & \cdots & h_{MN}(f) \end{bmatrix} \quad \text{Eq. 1}$$

where $h_{ij}$ is the gain and phase (complex) of the channel between transmit antenna i (i=1, . . . , N) and receive antenna j (j=1, . . . , M). It should be noted that each of these parameters are frequency (f) dependent.

From test signals 55, the coherence bandwidth of the channel can be determined and then the OFDM subcarrier bandwidth can be appropriately determined. Specifically, from the pilot signals, the rms delay spread (standard deviation of the time delay of the signals) of each channel is calculated, with the coherence bandwidth proportional to the inverse of the rms delay spread (as is well known in the state of the art in communication systems). The subcarrier spacing of the OFDM signals (tone bandwidth) is then set to be less than the coherence bandwidth of these channels. The values of the subcarrier spacing are stored in memory for use in processing the received signals and transmission to asset 50.

Optimized transmission and reception antenna weights at each signal frequency (e.g., OFDM subcarrier) can be determined by singular value decomposition:

$$H = U\Lambda V^H = \sum_{i=1}^{min(M,N)} \lambda_i u_i v_i^H \quad \text{Eq. 2}$$

Parameters V and U are the transmit (array 60) and receive (array 62) weight matrices, respectively, and Λ is a diagonal matrix of eigenvalues corresponding to the strength of each of the spatial channels (the number of which is less than or equal to the minimum of M and N) between arrays 60 and 62. Min(M,N) is the minimum of M and N. Superscript H is the Hermitian (i.e., complex conjugate transpose) of the matrix. There are min(M,N) spatial channels, each with transmit weight vector $v_i$ and receive weight vector $u_i$ and power $\lambda_i$ (i=1, . . . , min(M,N)). While these parameters are frequency dependent, the frequency parameter has been removed from the illustrated equation for purposes of convenience. The spatial channels (which also vary with frequency) may then be allocated different powers using, for example, a waterfilling algorithm, as will be understood by one of ordinary skill in the art. In one embodiment, the waterfilling algorithm may be described as follows. Given that there are N channels with eigenvalues $\lambda_i$, i=1, . . . , N, receiver noise per channel of $\sigma^2$, and total transmit power constraint P, the transmit powers $P_n$, n=1, . . . , N for each of the channels that maximizes the total capacity of the system is provided by:

$$P_n = \max\left(0, \varepsilon - \frac{\sigma^2}{|\lambda_n|}\right), \quad \text{Eq. 3}$$

$$\text{with } P = \sum_{n=1}^{N} P_n$$

The value for ε may be determined iteratively. The amount of power allocated to each channel is equivalent to that for filling a vessel up to a given level. If there is not enough total power P, some channels may not have power allocated to them, (i.e., these channels are not used). That is, these operations may result in only a fraction of the frequency/spatial channels being used at any given time.

Figure 3A:
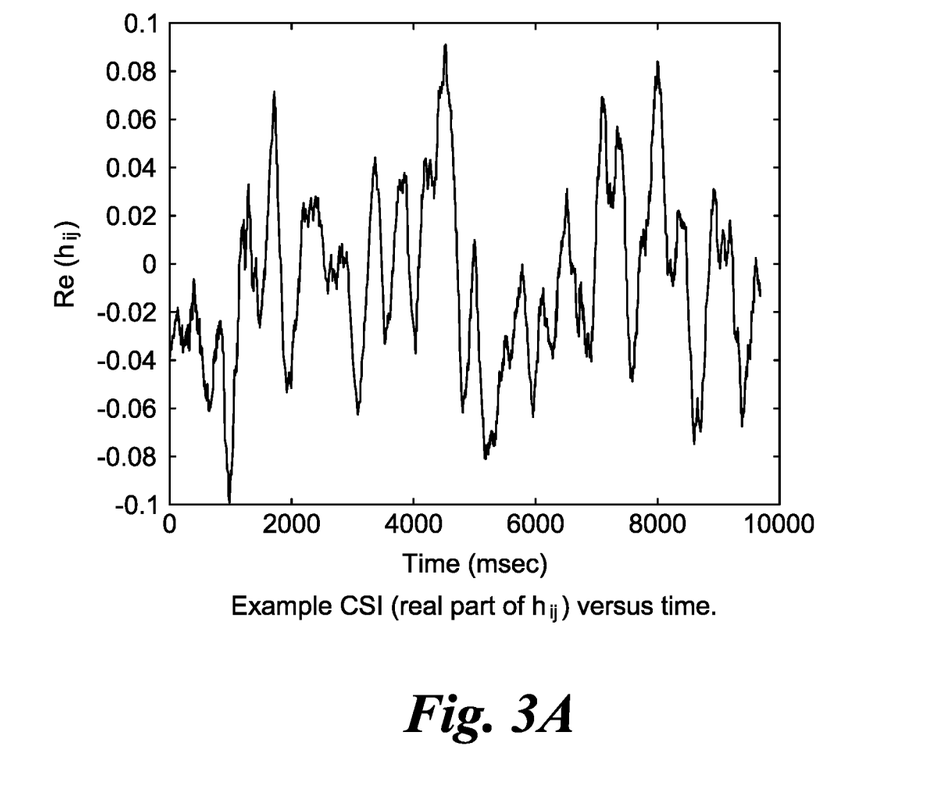
FIG. 3A is a graphical illustration showing exemplary channel state information versus time.
Figure 3B:
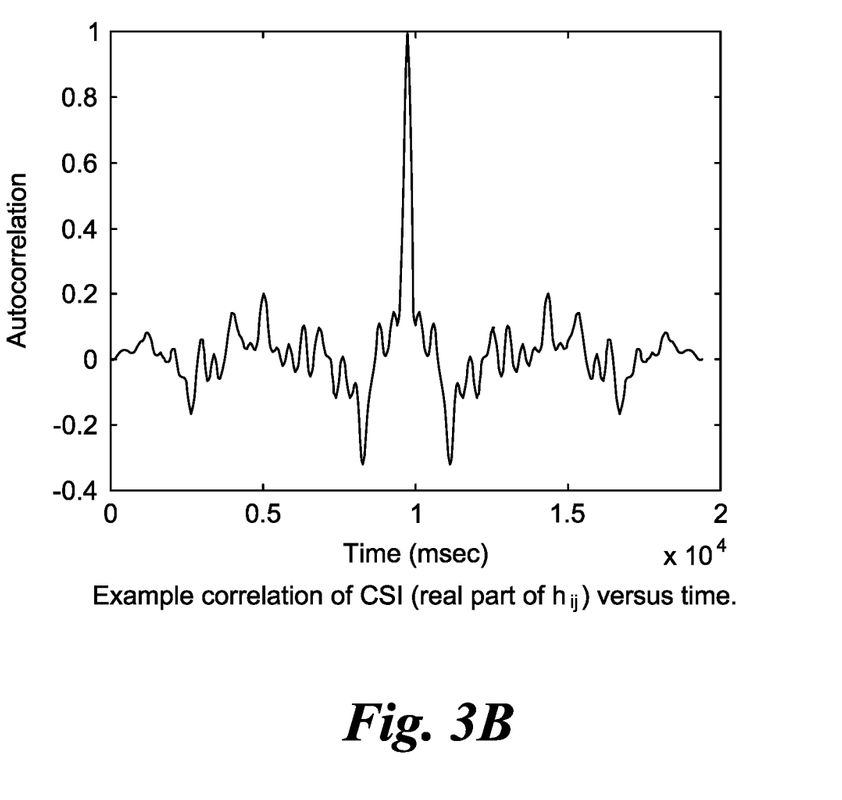
FIG. 3B is a graphical illustration showing an exemplary autocorrelation of channel state information versus time.
Figure 3C:
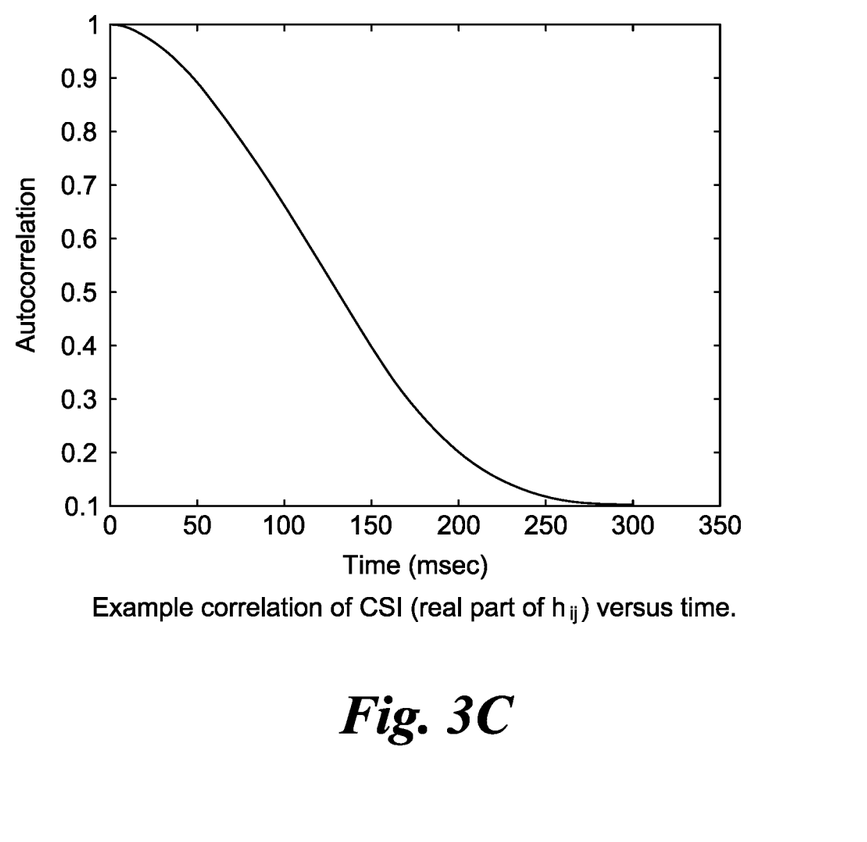
FIG. 3C is a graphical illustration showing the exemplary autocorrelation of channel state information versus time on an expanded scale.

As test signals 55 may be transmitted periodically, any changes in the calculated CSI over time may be measured, stored and used to estimate the coherence time of the channels, which is calculated as the time over which the CSI values have a correlation above a given value (e.g., 90%). FIG. 3A shows an example of the real part of $h_{ij}$ (part of the CSI) as a function of time. FIG. 3B illustrates the autocorrelation of the example in FIG. 3A, showing that the CSI is correlated over a short time interval. FIG. 3C illustrates an expanded in time version of the autocorrelation, showing that the correlation is 90% at a time offset of about 50 msec. Thus, for this example, the coherence time is about 50 msec, and the information on the CSI would need to be fed back from the receiver and used by the transmitter within this time interval.

Optimized transmission parameters (e.g., transmit antenna element weights) and channel coherence time 56 are transmitted (e.g., via adaptive antenna array 62) or otherwise conveyed to first asset 50 and implemented thereby for optimizing subsequent communications 57 between assets 50,52. More specifically, the above-calculated weights may be applied to each antenna element of array 60 to adjust an antenna beampattern for each of the transmitted spatial signals, and/or the gain and phase of the signals transmitted from each antenna element to thereby optimize performance. Likewise, optimized reception parameters, including optimizing weights for the receiving antenna elements of array 62 may be applied by asset 52 for improving reception performance.

In one embodiment, optimized transmission parameters 56 are transmitted in the form of a code (e.g., a numeric sequence) indicative of one or more entries in a predetermined codebook or code database. This database (not shown) is accessible by first asset 60, or a processing system associated therewith, for determining the optimized transmission parameters, such as appropriate transmit weights, OFDM subcarriers/spacing, spatial multiplexing, and whether the troposcatter or ducting channel (or both) are to be used. In this way, a reduction in the data rate needed between assets for this information may be realized.

When there are more than two assets in communication, ad hoc networking (which is also referred to as cognitive networking) may be implemented, represented herein as network 51. Optimizing parameters may be estimated for all links between the various assets 50,52,54 and the CSI for all the links may be provided to each of the assets via network 51. The use of ad hoc networking may improve reliability by offering a plurality of possible communication routes between assets, e.g., asset 50 may communicate directly using link 57 to asset 52 or through asset 54 instead. Waterfilling algorithms may be used to determine the links used (with centralized or, alternatively, distributed processing) and the corresponding power for each spatial/frequency channel for each link, e.g., extending the optimization process between two assets with multiple spatial channels (as described above) to include links between more than two assets.

It should be understood that the use of adaptive antenna arrays allows the coherent combining of multipath signals in the ducting/troposcatter channel to provide a diversity gain against multipath fading. The multiple antennas can also be used for MIMO communications, whereby the multiple spatial channels between the multiple transmit and receive antennas are used to send different signals, i.e., different information streams are transmitted via each spatial stream, thereby achieving up to an M-fold increase in data rate using M transmit and M receive antennas.

Likewise OFDM operations divide a given bandwidth into multiple overlapping (but orthogonal) frequency channels (or subcarriers). Any limitations in data rate due to delay spread may be overcome by setting the bandwidth of each of these frequency channels, i.e., the subcarrier bandwidth, to less than the coherence bandwidth of the propagation channels, so that negligible ISI is present in each frequency channel. The use of frequency diversity (i.e., the ability to use any of a wide variety of frequency channels) mitigates the effect of a varying channel gain, i.e., fading, at any single frequency.

Further performance improvement is achieved by jointly optimizing one or more of the above techniques, which requires channel probing and feedback from the receiver(s) to the transmitter(s), which is effective if the coherence time of the channel is long enough, i.e., longer than the processing and feedback time from the receiver to the transmitter, (e.g., longer than 1 ms for a 100 km link). The combination of these techniques means that although duct and troposcatter channels may be unreliable and have short range and low data rates, e.g., 50% availability at 10 kbps, for any one frequency channel and transmit/receive antenna direction, a communication network achieves reliability, e.g., greater than 99% availability, with long range (e.g., 300 km) and high data rate (e.g., on the order of Gbps or greater) at some set of frequencies and transmit/receive antenna patterns.

Figure 4:
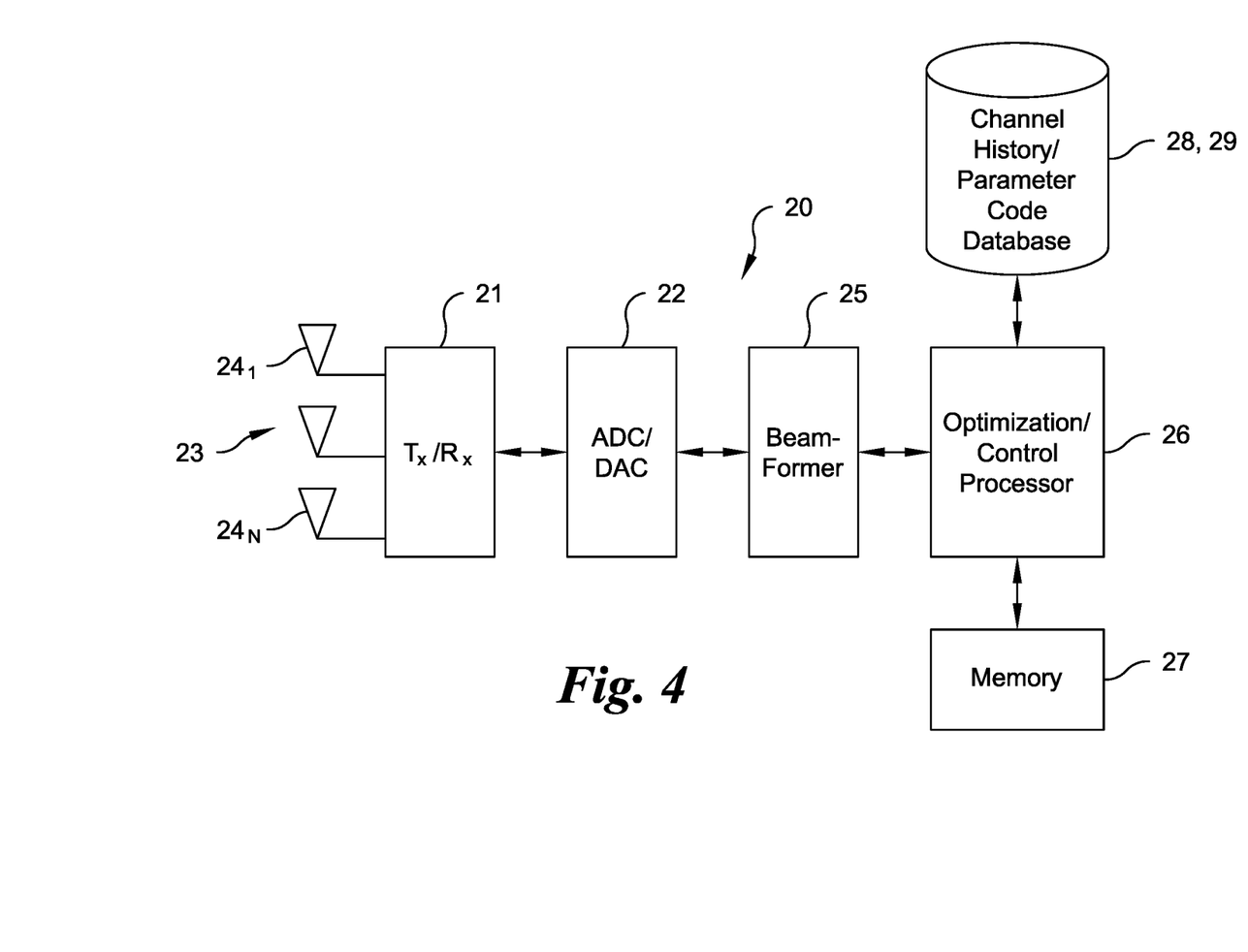
FIG. 4 is a simplified diagram illustrating an exemplary communication system according to an embodiment of the present disclosure.

FIG. 4 is a high-level diagram of an exemplary communication system (e.g., a system implemented into assets 50,52,54 of FIG. 2), such as an RF or microwave-based communication system, useful for implementing the above-described embodiments of the present disclosure. Exemplary communication system 20 may comprise a front-end module, including one or more transceivers 21 responsive to a control processor 26 for generating and transmitting a plurality of defined EM waveforms from an antenna 23. Antenna 23 may comprise one or more wideband adaptive antenna arrays forming a fully-digital array (or multiple subarrays) including a plurality of antenna elements $24_1$-$24_N$. Each antenna element $24_1$-$24_N$ can transmit/receive multiple signals with different amplitudes and phases at different frequencies over a wide bandwidth (e.g., over many octaves). As will be understood by one of ordinary skill in the art, transceiver 21 may include various processing components, such as one or more filters, a low-noise amplifier, and a down converter. It should also be understood that the illustrated transceiver may be embodied as one or more discrete transmitters and receivers without departing from the scope of the present disclosure.

At least one analog to digital converter (ADC) and digital to analog converter (DAC) 22 may be provided for converting received analog signals to digital form, and vice versa. A duplexer or switching element (not shown) may also be provided for alternating between transmission and reception channels of transceiver 21. A beamformer 25 may be provided and controlled via processor 26 for selectively generating desired beampatterns of signals to be transmitted, as well as adjusting the antenna beampattern during reception operations (e.g., by applying the above-described calculated optimizing weights).

Instructions for performing the optimizing algorithms according to embodiments of the present disclosure, as well as for the general operation of communication system 20, may be stored on a memory device 27 and selectively executed via processor 26. Moreover, as set forth above, when operating as a part of a receiving asset, processor 26 may be responsive to data received from a historic channel database 28 for estimating a channel coherence time. Likewise, when operating as part of a transmitting asset, processor 26 may also access a parameter code database 29 for associating a received code (e.g., a numeric sequence) with optimizing transmission weights, OFDM subcarriers/spacing, spatial multiplexing, and an indication of whether the troposcatter or ducting channel (or both) are to be used.

It should be understood that the beamforming operations of communication system 20 may be performed in part after analog conversion by ADC/DAC 22, with hybrid analog/digital beamforming, as well as with reconfigurable/switched antenna arrays. Furthermore, beamforming is accomplished at different frequencies with OFDM, which uses a fast Fourier transform (FFT) and inverse FFT (IFFT). In addition, antennas elements $24_1$-$24_N$ may comprise differing or modifiable polarizations.

Figure 5:
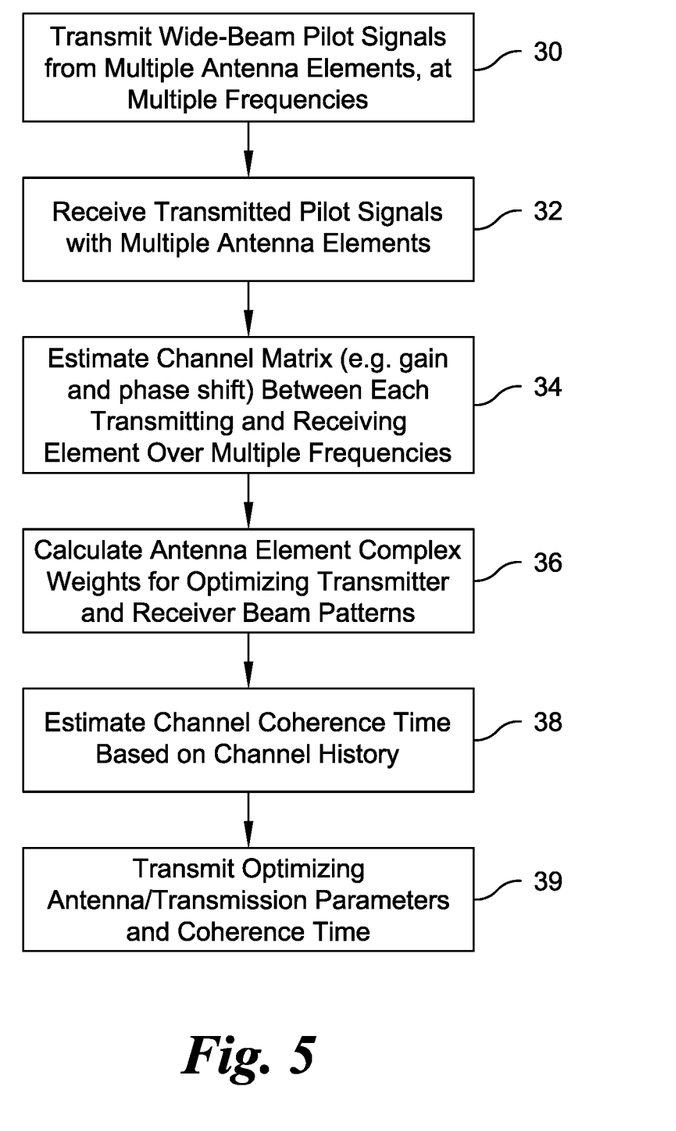
FIG. 5 is a process diagram illustrating steps of an exemplary communications optimizing process or algorithm according to an embodiment of the present disclosure.

Referring generally to FIG. 5, an embodiment of an optimizing technique according to the present disclosure is described in the context of BLoS communications between two assets (e.g., assets 50 and 52 of FIG. 2). It should be understood that each asset may comprise a communication system similar to that described above with respect to FIG. 4. In a first step 30, a first asset transmits a plurality of pilot or test signals over a wide spatial angle. These test signals are transmitted from multiple antenna elements at multiple frequencies as well as with different polarizations. The frequencies are chosen, based on the coherence bandwidth, e.g., the frequencies can be equally spaced with a separation of half the coherence bandwidth, to provide an accurate estimate of H(f) (channel state information) over the frequency bands of interest. In step 32, all or a portion of these pilot signals are received by a second asset, and subsequently processed (e.g., by processor 26 of FIG. 4), as described above, to determine an optimum combination of both transmitter and receiver antenna weighting (e.g., optimum antenna beampatterns, power, polarization, etc.). This processing may include the step of estimating a channel matrix (e.g., calculating gain and phase shift) between transmitting and receiving elements over multiple frequencies (step 34).

In a subsequent step 36, based on the estimated channel matrix, individual weights for each transmitting and receiving antenna element may be calculated for optimizing transmitter and receiver performance for the given atmospheric conditions at different frequencies for a given time. For example, optimum power allocation among different OFDM subcarriers and the degree of spatial multiplexing (the number of different signals to be transmitted using MIMO techniques) may be estimated. From these estimations, as well as other parameters such as traffic loading, priorities, and LPI/LPD requirements, a determination as to whether to use troposcatter, ducting, or a combination of the two channels for optimum communication may be made, using, e.g., waterfilling as described above. For example, if the troposcatter channel has substantially greater loss than the ducting channel, then waterfilling could result in the use of only the ducting channel, and vice versa.

In a step 38, a channel coherence time (or an interval during which optimal communications conditions will be present) is estimated based on, for example, the change in calculated CSI over time. Once these optimizing antenna parameters have been calculated, parameters relevant to transmission operations, along with the estimated coherence time, are communicated to the first asset (step 39). These parameters may be communicated between the above-described transceiver and antenna of each asset, or via any other suitable communication means, without departing from the scope of the present disclosure. In one embodiment, rather than transmitting the calculated optimizing parameters to the first asset, the second asset may transmit only a number or numbers indicative of an entry in a predetermined codebook accessible by the first asset for determining transmit weights, OFDM subcarriers/spacing, spatial multiplexing, and whether the troposcatter or ducting channel (or both) are to be used.

Figure 6:
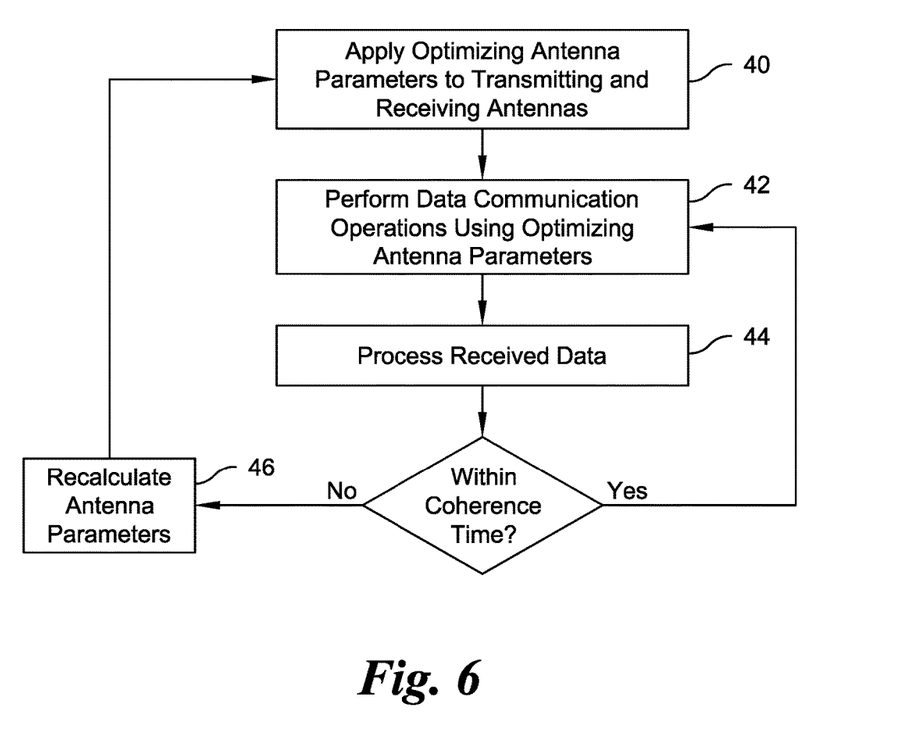
FIG. 6 is a process diagram illustrating additional steps of an exemplary communications optimizing process according to an embodiment of the present disclosure.

Referring generally to FIG. 6, optimizing parameters received by the first asset are implemented into or applied to its communication system (step 40). Likewise, optimizing reception parameters are applied to the communication system of the second asset. Once applied, the first asset may generate communication signals using the requested weights, OFDM subcarriers/spacing, spatial multiplexing, and channel information (step 42), which are subsequently received by the second asset (step 44). If the communication operations are being performed within the estimated coherence time of the channel, transmitting and receiving operations may continue using the previously-calculated optimizing parameters. However, if the coherence time has been exceeded, the first asset may be notified and a re-calculation of optimizing parameters may be performed in a step 46 (e.g., as set forth in FIG. 5).

In another embodiment, upon receipt of each transmission by the first asset, the second asset may re-estimate the coherence time of the channel being utilized based on past CSI measurements, and send an updated estimated coherence time to the first asset. In this way, the first asset is enabled to send pilot tones as described above before the channel changes significantly for channel estimation by the second asset. It should be understood that the same optimizing processing may be used on the reverse channel (e.g., communication originating from the second asset to the first asset).

In still another embodiment, a network with more than two assets uses ad hoc networking, wherein multiple links are available to communicate between any two assets, with CSIs between all assets calculated and made available at all users, using the methods described above. In this case, the receiving asset, or a network controller (not shown) may determine the most advantageous links in combination with the power allocation of the frequency subcarriers and spatial channels for each link. This may be accomplished initially with waterfilling algorithms. However, as the assets move, the channels change, and the traffic changes, continual re-optimization is needed at a rate faster than the coherence time of the channels. In this case, a greedy algorithm is used for changing the power allocation to reduce computational complexity. Specifically, with the greedy algorithm, only small changes (e.g., a limited number of additions or removals) to the links/frequency/spatial multiplexing are made for each update (e.g., those changes that have the largest improvement in overall network capacity still meeting the system constraints). Although the network is then suboptimal, the network changes are limited at each re-optimization step.

The embodiments are provided by way of example only, and other embodiments for implementing the methods described herein may be contemplated by one of skill in the pertinent art without departing from the intended scope of this disclosure. For example, systems, including the control processor, may include memory containing data, which may include instructions—instructions, when executed by a processor or multiple processors, cause the steps of a method for performing the signal processing and system control set forth herein. Software may be embodied in a non-transitory machine readable medium upon which software instructions may be stored, the stored instructions when executed by a processor cause the processor to perform the steps of the methods described herein. Any suitable machine readable medium may be used, including, but not limited to, magnetic or optical disks, for example, CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method of optimizing beyond line-of-sight communications between a first asset and a second asset using at least one of atmospheric troposcatter and ducting signal propagating phenomena comprising:
    receiving at least a portion of a plurality of test signals transmitted by at least one transmitting antenna element of the first asset at at least one receiving antenna element of the second asset;
    calculating with at least one processor, channel state information between each of the transmitting and receiving antenna elements, wherein calculating the channel state information includes calculating information for a troposcatter channel and a tropospheric ducting signal propagating channel;
    calculating with the at least one processor, optimized antenna weights for each at least one of the transmitting and receiving antenna elements according to the calculated channel state information between each transmitting and receiving element; and
    applying the optimized antenna weights to the at least one of the transmitting and receiving antenna elements.

2. The method of claim 1, wherein the step of calculating channel state information includes calculating a gain and phase shift for a channel between each transmitting and receiving antenna element.

3. The method of claim 1, further comprising the step of transmitting the plurality of test signals from a plurality of transmitting antenna elements of the first asset into the atmosphere.

4. The method of claim 3, wherein the plurality of test signals are transmitted in a plurality of directions.

5. The method of claim 4, wherein the plurality of test signals are transmitted at a plurality of frequencies.

6. The method of claim 4, wherein the plurality of test signals are transmitted at a frequency between about 2 GHz to about 20 GHz and at an elevation between about 0 degrees and about 10 degrees.

7. The method of claim 4 wherein the plurality of test signals are transmitted with a plurality of polarizations.

8. The method of claim 1, wherein said communication between said first asset and said second asset is point to point communication, conducted at a distance of at least 100 kilometers.

9. The method of claim 8, wherein the step of estimating a communication channel coherence time includes determining changes in channel state information calculated over time.

10. The method of claim 8, further comprising the steps of:
    transmitting data indicative of the optimized antenna weights for the at least one transmitting antenna element of the first asset and the estimated channel coherence time to the first asset;
    receiving the transmitted data with the antenna of the first asset; and
    applying the optimized antenna weights to the at least one transmitting antenna element of the first asset.

11. The method of claim 10, wherein the data indicative of the optimized antenna weights and the estimated channel coherence time is formatted as one or more numerical codes.

12. The method of claim 11, further comprising the steps of:
    receiving the one or more numerical codes with the first asset; and
    determining the optimized antenna weights and estimated channel coherence time from the one or more numerical codes.

13. The method of claim 10, further comprising the step of transmitting data from the first asset to the second asset using the optimized antenna weights.

14. The method of claim 13, further comprising the step of continuing to transmit data from the first asset to the second asset using the optimized antenna weights until the estimated channel coherence time has elapsed.

15. The method of claim 14, wherein the steps of receiving transmitted test signals, calculating channel state information, calculating optimized antenna weights, and estimating a communication channel coherence time are repeated before the estimated channel coherence time has elapsed.

16. A system for optimizing beyond line-of-sight communications between a first asset and a second asset using at least one of atmospheric troposcatter and ducting signal propagating phenomena comprising:
    a receiving antenna array comprising a plurality of antenna elements;
    one or more computer processors; and
    a memory in communication with the one or more processors and storing program instructions, the one or more processors operative with the program instructions to:
        receive at least a portion of a plurality of test signals transmitted from an antenna array of the first asset comprising multiple antenna elements at the plurality of antenna elements of the receiving antenna;
        calculate channel state information between each transmitting and receiving antenna element, wherein calculating channel state information includes calculating information for a troposcatter channel and a tropospheric ducting signal propagating channel;

calculate optimized antenna weights for at least one of the transmitting and receiving antenna elements according to the calculated channel state information between each transmitting and receiving element;

estimate a communication channel coherence time; and apply the optimized antenna weights to at least one of the transmitting and receiving antenna elements.

17. The system of claim 16, wherein the step of calculating channel state information includes calculating a gain and phase shift for a channel between each transmitting and receiving antenna element.

18. The system of claim 17, wherein the plurality of test signals includes a plurality of signals having differing frequencies.

19. The system of claim 16, wherein the one or more processors are further operative with the program instructions to transmit data indicative of the optimized antenna weights for the transmitting antenna elements of the first asset and the estimated channel coherence time to the first asset.

20. The system of claim 19, wherein the data indicative of the optimized antenna weights and the estimated channel coherence time is formatted as one or more numerical codes.

* * * * *